United States Patent Office 2,831,762
Patented Apr. 22, 1958

2,831,762

TREATING CONVERTER WASTE GASES

Roland Kemmetmuller, Vienna, and Rudolf Rinesch, Linz (Danube), Austria, assignors to Waagner-Biro Aktiengesellschaft, Vienna, Austria, an Austrian firm, and Vereinigte Osterreichische Eisen- und Stahlwerke Aktiengesellschaft, an Austrian firm No Drawing. Application April 4, 1955
Serial No. 499,245

Claims priority, application Austria April 6, 1954

2 Claims. (Cl. 75—60)

In the conventional converters for refining iron or non-ferrous metals with air-oxygen-enriched air or pure oxygen, the exhaust gases from the converters were mixed with fresh air and the resulting mixed exhaust gas was fed to exhaust gas cooling and gas cleaning plants.

Exhaust gases from converter plants operating on pure oxygen consist mainly of carbon monoxide and oxygen and contain substantial quantities of metal vapours and solid metal particles entrained from the metal bath during the refining process. In converter plants operating on normal air or oxygen-enriched air the exhaust gases contain also nitrogen. In converters which are used, e. g., for making steel, the solid particles escaping in the exhaust gas consist mainly of FeO, $Fe_3C$, $FeCO_3$, in granular form.

The exhaust gases leave the mouth of the converter at temperatures between 1600 and 1800 deg. C. Behind, i. e., after leaving the converter outlet the solid particles are oxidized in the presence of an excess of air to form mainly $Fe_2O_3$, which causes the known intensive red colouring of these particles because $Fe_2O_3$ is the only iron oxygen compound of red colour. As has been mentioned the exhaust gases from converters operating on air or oxygen contain nitrogen, which retards the oxidation to $Fe_2O_3$ so that in these plants the escaping particles do not or only at a later time disintegrate to $Fe_2O_3$. The particle sizes of the iron compounds FeO, $Fe_3C$ and $FeCO_3$ are in the order above 1 micron. When these compounds are oxidized to form $Fe_2O_3$ they disintegrate to form particles smaller than 1 micron. That reduction in particle size renders the removal of these particles from the exhaust gases most difficult.

The disintegration of the afore-mentioned iron compounds to form $Fe_2O_3$ takes place at temperatures between 1600 and 2000 deg. C. in the presence of surplus oxygen.

Plants have been constructed in which such exhaust gases containing these fine dust particles are conducted through gas cooling and cleaning plants. All these processes employ oxygen in a larger quantity than is necessary for the theoretical combustion of the CO gas escaping from the converter. This is the cause of the aforementioned formation of $Fe_2O_3$, which involves the aforedescribed disintegration of particles and intensive red colouring of the escaping exhaust gases. The large excess of air also causes a considerable increase in the quantities of gas so that unduly large exhaust gas cooling and cleaning plants are required.

It may be mentioned that in plants where the exhaust gases contain also nitrogen the particle sizes are almost ten times larger than in plants operating on pure oxygen.

All disadvantages described hereinbefore are avoided according to the invention by admixing oxygen to the carbon monoxide containing exhaust gases and vapours formed in the converter substantially only in such a quantity as is required for the theoretical combustion of the carbon monoxide formed in the converter.

In a development of the process the temperature of the exhaust gases from the converter is reduced immediately after leaving the converter to such an extent that the oxidation of FeO to $Fe_2O_3$, possible only at a certain temperature, cannot take place whereas the carbon monoxide is still oxidized to form carbon dioxide. Thus the heat-delivering combustion of the iron compounds to form $Fe_2O_3$ is prevented.

Since the formation of $Fe_2O_3$ has been prevented the exhaust gases contain only iron carbon compounds or iron oxygen compounds of black or grey colour and with particle sizes much above that of $Fe_2O_3$.

Furthermore, the concentration of dust in the exhaust gas stream is multiplied by the reduction of the quantities of gas compared to the previous processes. This facilitates substantially the removal of the dust particles from the exhaust gas stream.

The reduction of the heat of the exhaust gases enables a reduction in the size of the cooling plant and a more favourable utilization of the dust recovered. All iron compounds excepting $Fe_2O_3$ are readily utilized and can be returned to the steel making process.

As has been mentioned, extremely high temperatures are required for igniting the iron compounds leaving the converter, which are relatively slow in combustion so that the previous process required waste heat utilization plants having large combustion spaces and very large heating surfaces.

Thus the process according to the invention, in which only the heat produced from the carbon monoxide is utilized, leads to much smaller and less expensive plants.

The reduction of the quantity of gas entails also an economy of power in the exhaust fans because in a given plant the resistance varies with the square of the rate.

As has been mentioned the high dust concentrations due to the smaller quantities of exhaust gases are a special advantage particularly where wet cleaning plants are used. The residual particles leaving the stacks behind such plants are grey in colour and thus give a pleasant appearance compared to the previous plants, which discourage dark-red smoke clouds from the stack.

In view of the great variation in the quantity of carbon monoxide (CO) during the blowing period the invention provides for controlling the oxygen supply in harmony with the quantity of carbon monoxide. In converters fed with oxygen at an even rate the oxygen surplus in or behind the converter will vary owing to the uneven formation of carbon monoxide. In another precess step that surplus of oxygen may be compensated by a supply of substances such as carbon monoxide or other oxygen combining gases.

We claim:

1. A process for treating the exhaust gases from a steel making converter containing carbon monoxide and solid particles consisting mainly of FeO, $Fe_3C$ and $FeCO_3$ by admixing an oxygen containing gas with the exhaust gases formed in the converter and after such gases have left the converter, substantially in such an amount as is required for the theoretical combustion of the carbon monoxide but insufficient to oxidize iron compounds to $Fe_2O_3$.

2. A process for treating the exhaust gases from a steel making converter containing carbon monoxide, metal vapors and solid particles consisting mainly of FeO, $Fe_3C$ and $FeCO_3$ by admixing an oxygen containing gas with the exhaust gases formed in the converter and after such gases have left the converter, substantially in such an amount as is required for the theoretical combustion of the carbon monoxide and cooling the exhaust gases from the converter immediately after leaving the converter to a degree that oxidation of metal vapors and metal particles to form $Fe_2O_3$ is inhibited in the presence of surplus oxygen.

(References on following page)

References Cited in the file of this patent

UNITED STATES PATENTS

| | | |
|---|---|---|
| 981,280 | Jones | Jan. 10, 1911 |
| 1,507,740 | Kirby | Sept. 9, 1924 |
| 1,742,750 | Bradley | Jan. 7, 1930 |
| 1,780,833 | McGurty | Nov. 4, 1930 |
| 1,889,757 | Miller | Dec. 6, 1932 |
| 1,902,160 | Frazer et al. | Mar. 21, 1933 |
| 2,014,044 | Haswell | Sept. 10, 1935 |
| 2,107,549 | Schmalfeldt | Feb. 8, 1938 |
| 2,373,244 | Holz | Apr. 10, 1945 |
| 2,409,825 | Baringoltz | Oct. 22, 1946 |
| 2,729,301 | Ekstrom | Jan. 3, 1956 |